United States Patent [19]

Arnold et al.

[11] Patent Number: 5,379,342
[45] Date of Patent: Jan. 3, 1995

[54] METHOD AND APPARATUS FOR PROVIDING ENHANCED DATA VERIFICATION IN A COMPUTER SYSTEM

[75] Inventors: William C. Arnold, Mahopac, N.Y.; Richard Bealkowski, Delray Beach, Fla.

[73] Assignee: International Business Machines Corp., Armonk, N.Y.

[21] Appl. No.: 1,354

[22] Filed: Jan. 7, 1993

[51] Int. Cl.⁶ .............................................. H04L 9/00
[52] U.S. Cl. ........................................... 380/2; 380/4; 380/23; 380/25; 380/49; 380/50
[58] Field of Search ................. 380/2, 4, 23, 25, 30, 380/49, 50

[56] References Cited

U.S. PATENT DOCUMENTS

| | | | |
|---|---|---|---|
| 4,908,861 | 3/1990 | Brachtl et al. | 380/25 |
| 4,937,861 | 6/1990 | Cummins | 380/2 |
| 4,975,950 | 12/1990 | Lentz | 380/4 |
| 5,007,082 | 4/1991 | Cummins | 380/4 |
| 5,019,899 | 5/1991 | Boles et al. | 358/84 |
| 5,022,077 | 6/1991 | Bealkowski et al. | 380/4 |
| 5,121,345 | 6/1992 | Lentz | 364/550 |
| 5,128,995 | 7/1992 | Arnold et al. | 380/4 |
| 5,144,660 | 9/1992 | Rose | 380/4 |
| 5,214,695 | 5/1993 | Arnold et al. | 380/4 |

OTHER PUBLICATIONS

Update for the IBM Personal Computer at-Technical Reference Manual P/N 6280070 (Revised Edition Mar. 1986) pp. 5-87-5-88.
Technical Reference-IBM Personal Computer XT Hardware Reference Library, (1983), p. 210.
Technical Reference-IBM Personal Computer XT Hardware Reference Library P/N 6936763, (1983), pp. A-89-A-90.

*Primary Examiner*—Bernarr E. Gregory
*Attorney, Agent, or Firm*—Robert S. Babayi

[57] ABSTRACT

A personal computer system compatible with application programs and operating system software. The personal computer system includes a microprocessor electrically coupled to a data bus, non-volatile memory electrically coupled to the data bus, volatile memory electrically responsive to the data bus and a direct access storage device electrically responsive to the data bus, the direct access storage device storing a second portion of operating system microcode. The non-volatile memory stores a first portion of operating system microcode and the direct access storage device stores a second portion of operating system microcode. The second portion of operating system microcode includes a boot program. The first portion of operating system microcode verifies the integrity of the boot program prior to loading the boot program into the volatile memory.

15 Claims, 6 Drawing Sheets

METHOD AND APPARATUS FOR PROVIDING ENHANCED DATA VERIFICATION IN A COMPUTER SYSTEM

FIELD OF THE INVENTION

This invention relates to personal computer systems and, more particularly, to a method and apparatus for verifying computer data.

BACKGROUND OF THE INVENTION

Personal computer systems in general, and IBM personal computers in particular, have attained widespread use for providing computer power to many segments of today's society. A personal computer system can usually be defined as a desk top, floor standing, or portable computer that includes a system unit having a system processor, a display monitor, a keyboard, one or more diskette drives, a fixed disk storage, an optional pointing device such as a "mouse," and an optional printer. These systems are designed primarily to give independent computing power to a single user or small group of users and are inexpensively priced for purchase by individuals or businesses.

Personal computer systems may be linked to form a network of computers (e.g., a Local Area Network (LAN)) so that users can exchange information, share I/O devices, and utilize a particular direct access storage device (DASD) such as a particular hardfile or diskette. Typically, the LAN includes a client and a server. A server is a computer system which includes a DASD for supplying the storage for one or more clients of the local area network.

With personal computers, software and hardware compatibility is of great importance. To provide software and hardware compatibility, an insulation layer of system resident code, also referred to as microcode, was established between the hardware and the software. This code provided an operational interface between a user's application program or operating system and the hardware device to relieve the user of the concern about the characteristics of hardware devices. Eventually, the code developed into a basic input/output system (BIOS), for allowing new hardware devices to be added to the system, while insulating the application program/operating system from the peculiarities of the hardware devices. The importance of BIOS was immediately evident because it freed a device driver from depending on specific hardware device characteristics while providing the device driver with an intermediate interface to the hardware device. Because BIOS was an integral part of the computer system and controlled the movement of data in and out of the system processor, it was resident on a system planar board of the system unit and was shipped to the user in either a read-only memory (ROM) or an erasable programmable read-only memory (EPROM). The ROM also contained a power-on self test (POST) program which was used to test and initialize the computer system. The accumulation of code resident in the computer system ROM became known as the "system firmware," or simply "firmware." Thus, the firmware included a POST portion and a BIOS portion. Sometimes, BIOS was defined to include the POST program.

The POST program tests and initializes the personal computer system. The completion of POST occurs when POST loads a boot program and transfers control to the boot program. The boot program is typically loaded from a storage device such as a disk. In prior art systems, before POST transfers control to the boot program, POST checks the boot program. As shown in "Technical Reference Personal Computer XT", January 1983, page A-90 Fixed Disk BIOS, program line 482, the boot program is checked for a generic boot block signature. The generic boot block signature is shown as a word hex value of 0AA55. The "Technical Reference Personal Computer XT" is hereby incorporated herein by reference. Additional checks where added as described in "Technical Reference Personal Computer AT", Nov. 15, 1985 update, page 5-88, program lines 375-387. The additional checks in the IBM Personal Computer AT POST included insuring that the first value of the boot program was not "6", and that the first eight word location values of the boot program were not identical. The "Technical Reference Personal Computer AT", Nov. 15, 1985 update version is hereby included herein by reference. POST attempted to check and verify the boot program using the above described techniques as were available at the time.

It is easily seen that the entirety of the boot program is not checked. The boot program is an essential part of the overall startup of a computer system and thus requires a more rigorous check and verification procedure.

SUMMARY OF THE INVENTION

An object of the present invention is to provide a method and apparatus for enhanced verification of computer programs and data loaded by the POST program.

BRIEF DESCRIPTION OF THE DRAWING

Further and still other objects of the present invention will become more readily apparent in light of the following description when taken in conjunction with the accompanying drawing, in which.

DETAILED DESCRIPTION OF THE PREFERRED EMBODIMENT

Figure 1:
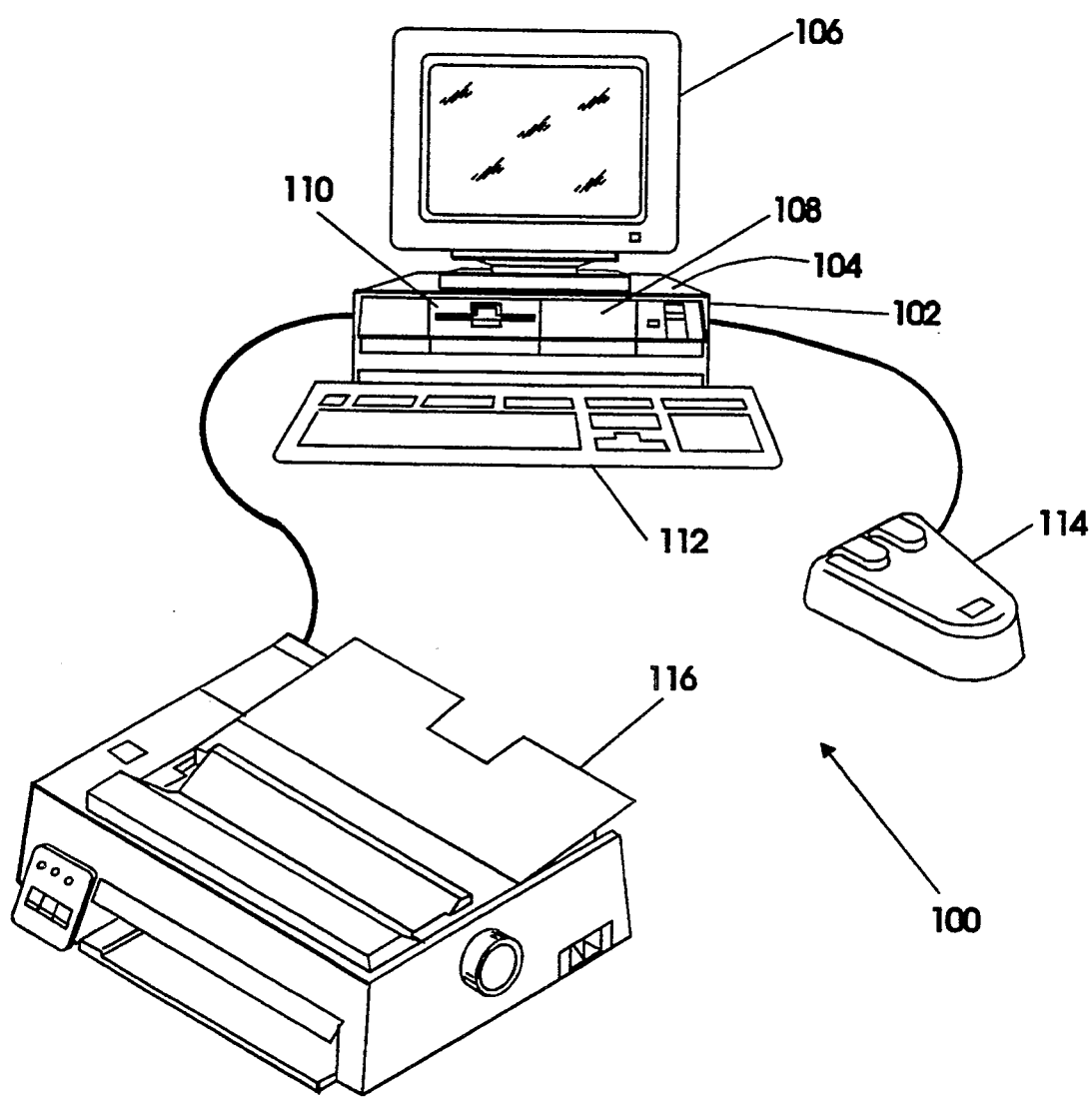
FIG. 1 is a perspective view of a typical personal computer system.

Referring to FIG. 1, there is shown a personal computer system 100 which employs the present invention. The personal computer system 100 includes a system unit 102 having a suitable enclosure or casing 104, output device or monitor 106 (such as a conventional video display), input devices such as a keyboard 112, an optional mouse 114, and an optional output device such as a printer 116. Finally, the system unit 102 may include one or more mass storage devices such as a diskette drive 110 (operable with a diskette - not shown) and a hard disk drive (hardfile) 108.

Figure 2:
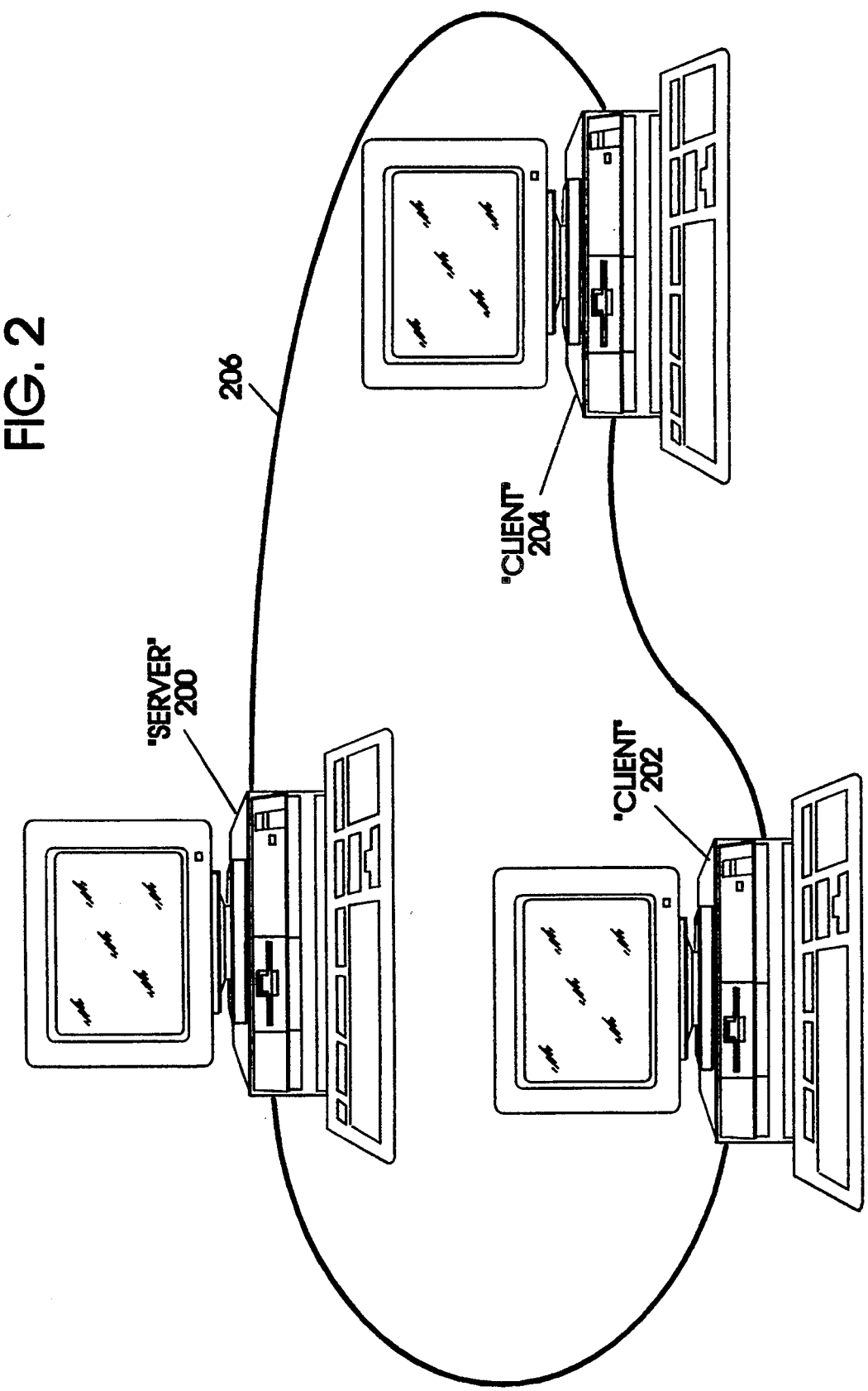
FIG. 2 is a diagrammatic view of a typical computer network.

Referring to FIG. 2, a system unit 200 may be connected electronically in a well-known manner with other system units 202, 204 to form a network 206. In the network, system unit 200 functions as the server and system units 202, 204 function as the clients. System unit 200 may be similar to system 100 of FIG. 1. System units 202, 204 may be similar to the unit 200, except that units 202, 204 include no drives 108, 110 and are thus referred to as medialess clients. Other conventional I/O devices may be connected to the system units 200, 202, 204 for interaction therewith.

Figure 3:
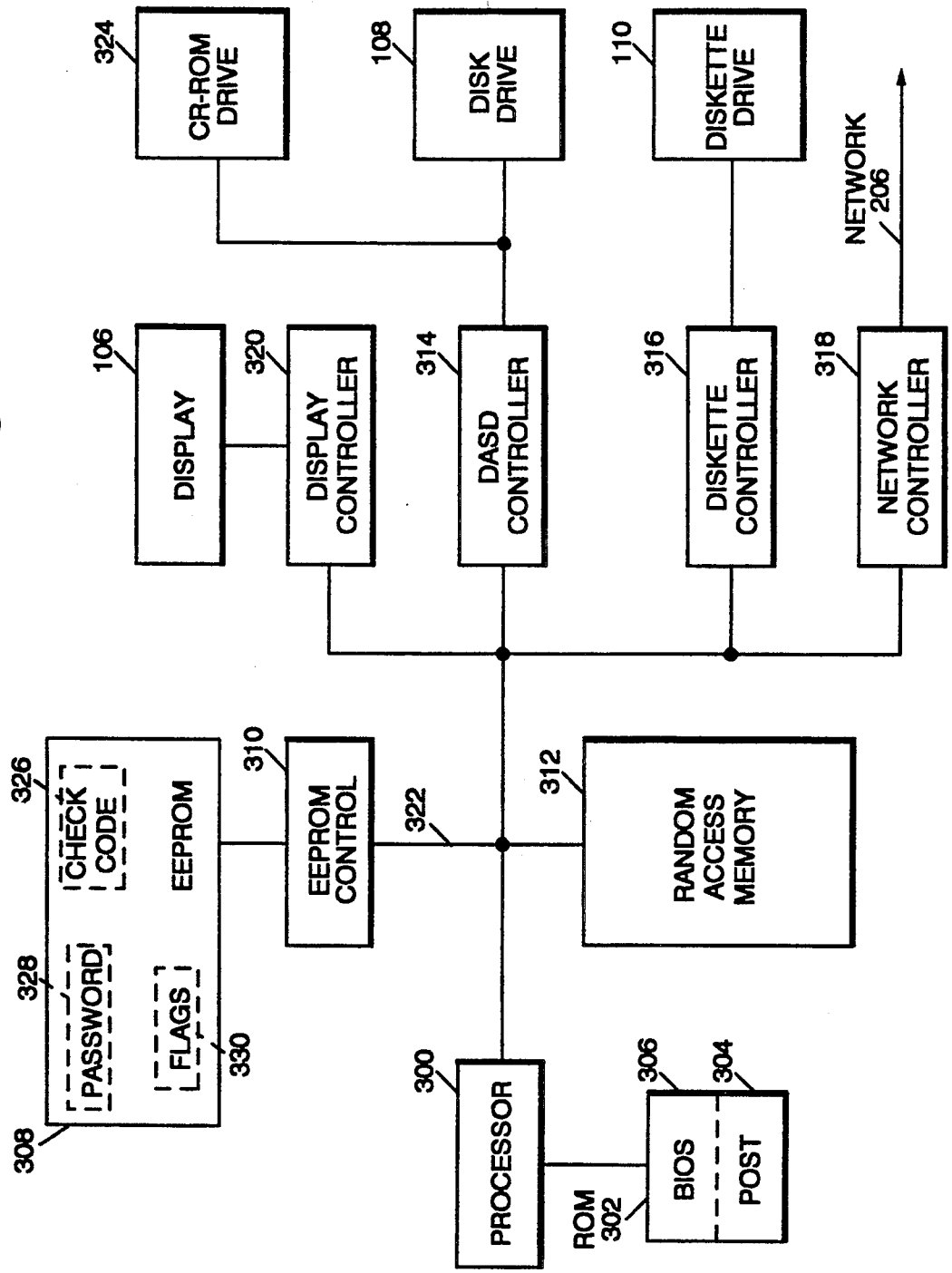
FIG. 3 is a block diagram for the computer system of FIG. 1.

Referring to FIG. 3, there is shown a block schematic diagram of computer system unit 102. System unit 102 includes processor 300 which is connected to read only memory (ROM) 302 (or other nonvolatile storage means such as an electrically programmable read only memory (EPROM)) which contains the POST 304 and BIOS 306 programs. POST is the set of instructions which execute when the system is first powered-on to initialize the personal computer system 100. BIOS is the set of instructions which facilitate the transfer of data and control instructions between the processor 300 and I/O devices. Processor 300 is also connected, via bus 322, to a plurality of subsystems. Many popular and well known computer busses are available for interconnecting the subsystems of FIG. 3. Random access memory (RAM) 312 is provided for the storage of programs and data. EEPROM 308 is an electrically erasable programmable read-only memory. Check code 326, password 328, and flags 330 are stored in different fields of EEPROM 308. EEPROM 308 is under control of EEPROM controller 310. Direct access storage device (DASD) controller 314 provides the interface and connection to disk drive 108. DASD controller 314 can also support other devices such as CD-ROM drive 324. CD-ROM drive 324 is operable with a CD-ROM (not shown). Diskette controller 316 provides the interface and connection to diskette drive 110. Diskette drive 110 is operable with a diskette (not shown). Network controller 318 provides computer system 1 00 with an interface and connection to network 206. Display controller 320 provides an interface and connection to a display device such as computer display 106. Other types of visual output devices are available for a computer system, display 106 is just one example.

EEPROM controller 310 provides processor 300 with the ability to read and write EEPROM 308. EEPROM controller 310 also allows the EEPROM read and/or write functions to be selectively disabled. Once a read or write function has been disabled, the computer system must be powered off before the function is reenabled. The system powers-on with both the read and write function enabled. The disable function provides an effective means to protect the EEPROM 308 contents. Preferably, read and write disable control is granular and can be selectively applied to the fields (check code 326, password 328, and flags 330) of EEPROM 308. EEPROM controller 310 is itself under control of processor 300. Processor 300 manages EEPROM controller 310 through typical input/output commands.

Password 328 is a "secret" text string determined and entered by the computer system user. Typically, a password utility program is run by the user for entering and storing password 328. Check code 326 is, preferably, a modification detection code (MDC) as described in commonly owned U.S. Pat. No. 4,908,861. The MDC is a cryptographic one-way function which calculates a 128-bit (16-byte) value from a given series of bytes without using a secret key. If a keyed cryptographic one-way function is used, the key used is password 328, padded or otherwise expanded as needed to be of a size as required by the cryptographic calculation. Check code 326, password 328, and flags 330 are further described in conjunction with FIGS. 5 and 6.

POST contains a bootstrap program which attempts to locate a boot device and load a boot program. Typically, the boot device is hardfile 108 or diskette drive 110. The boot device can also be CD-ROM 324 or network 206 which is accessed via network controller 318. Diskette drive 110 requires a boot or operating system diskette to operate. If POST successfully loads a boot program from a boot device, then POST transfers control to the boot program, completing the operation of the POST bootstrap program. In the medialess environment, a medialess system unit (e.g., 202) includes a suitable network controller 318 for providing a Remote Initial Program Load (RIPL) facility within the unit 202. The RIPL program permits booting an operating system from network server 200 rather than from a local storage device such as the fixed disk 108 or the diskette 110. RIPL is also referred to as simply Remote Program Load or RPL, and the terms are used interchangeably. RPL is well understood in the art. If a boot record was unable to be loaded and an RPL adapter is present, then POST transfers control to an RPL program. If no RPL program is present, then POST prompts the user indicating that a boot source is required.

Figure 4:
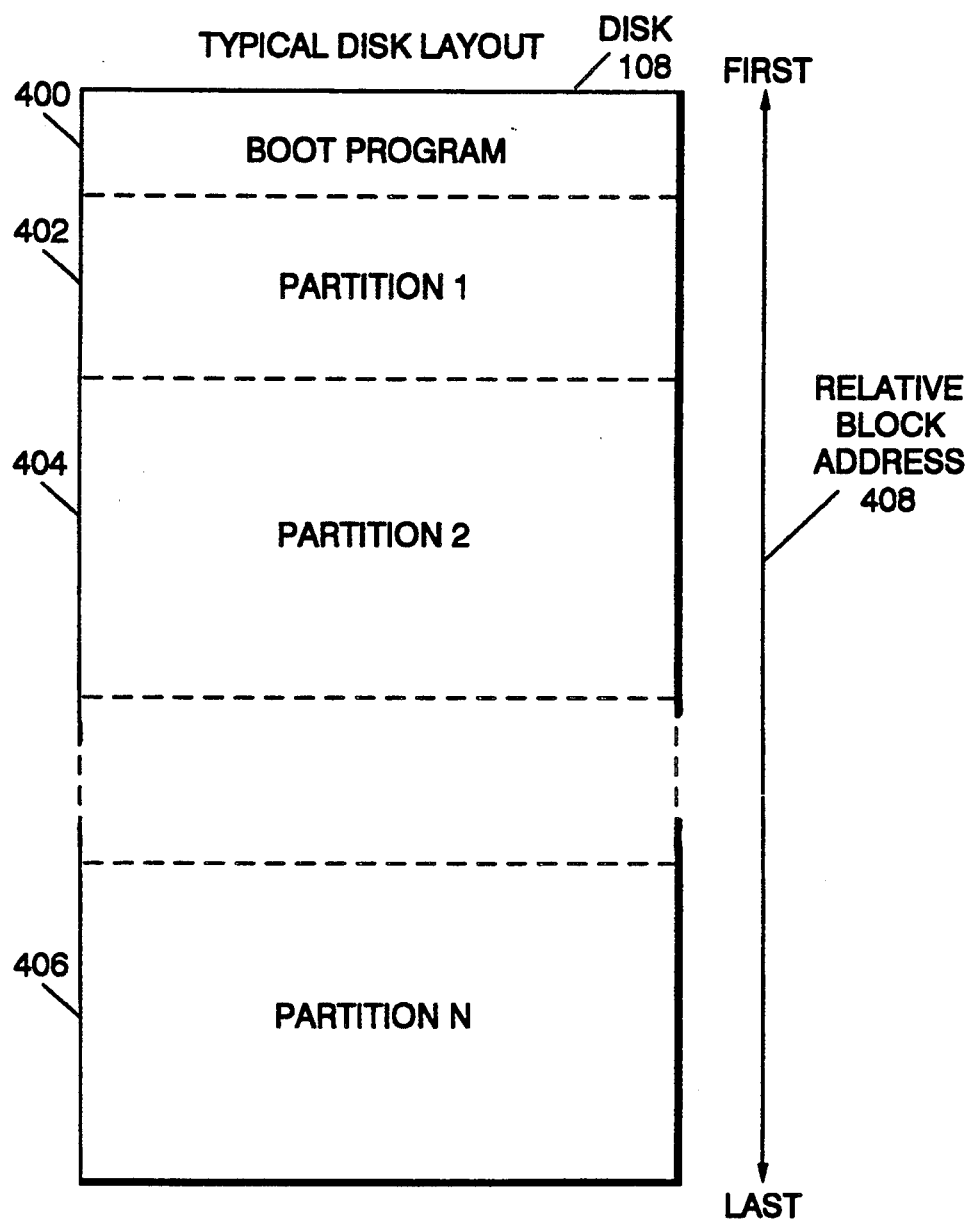
FIG. 4 is a diagrammatic view of a typical disk layout.

Referring to FIG. 4, there is shown a typical layout of the data residing on the personal computer disk 108. The storage unit for data on a personal computer disk 108 is referred to as a sector. A sector is a block of 512 data bytes. A sector is identified by a relative block address (RBA) 408. Each sector has a unique RBA value. Typically, the first sector is indicated by an RBA value of 0, the second sector by an RBA of value 1, the third sector an RBA value of 2, and so on. Stored on disk 108 is a boot program 400. The boot program 400 is a program which is responsible for beginning the load of an operating system from one of a plurality of partitions 402, 404, 406, each partition including a plurality of sectors. The boot program 400 includes two components, a program code component and a partition table data component. By partitioning the disk, a plurality of operating systems may be simultaneously stored on a single disk 108. Only one partition is "booted" when the computer system is initializing. The boot program code component examines the partition table data component to determine which partition, if any, is designated as an active partition. Typically, it is the active partition which contains the user's operating system. The active partition is designated by a flag within the partition table data component of the boot program 400. The boot program 400 loads the program contained within the disk partition (the disk partition program) and transfers control to the disk partition program. If the active partition contains an operating system then the disk partition program proceeds with loading the operating system from the partition.

Figure 5:
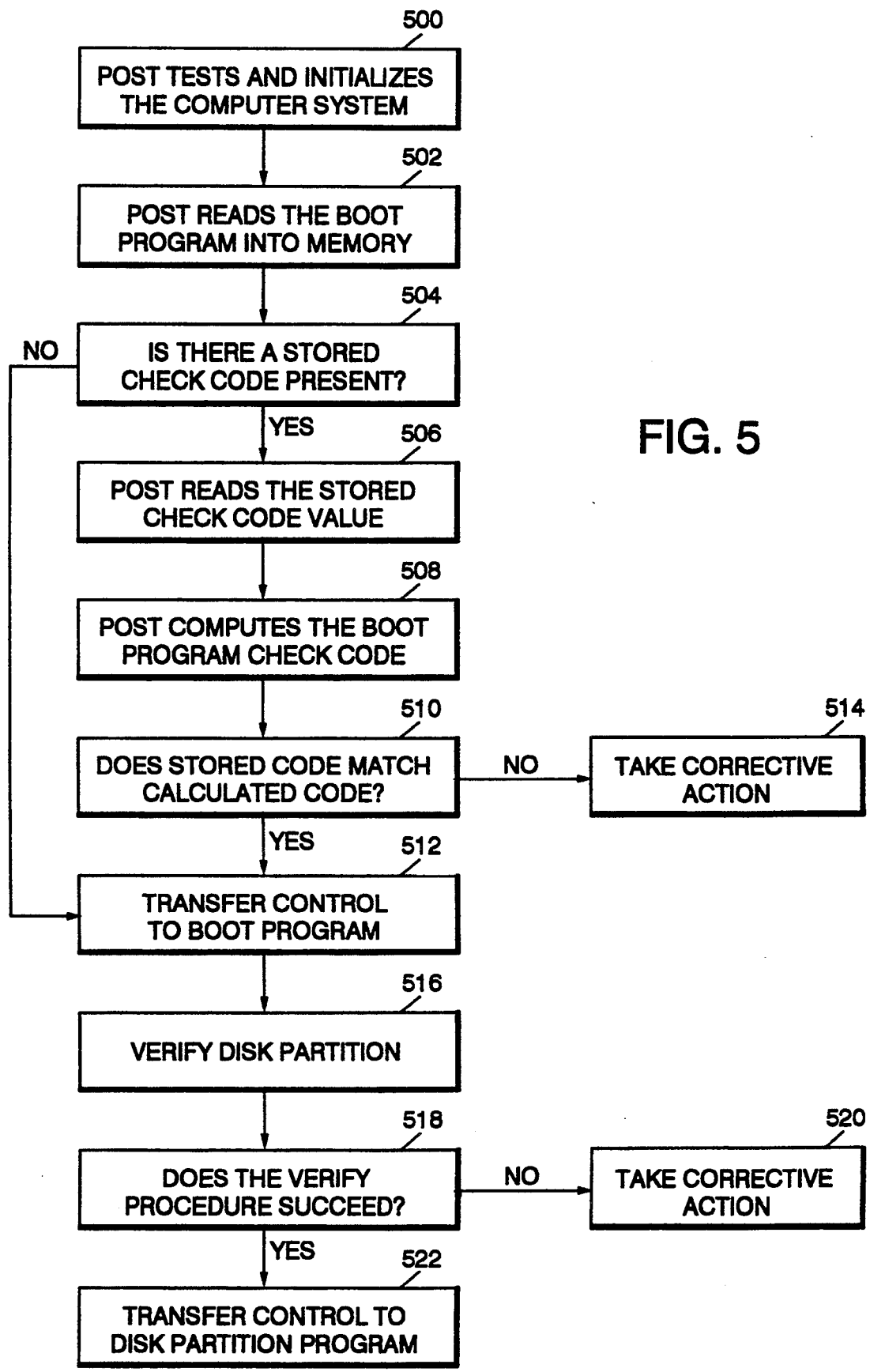
FIG. 5 is a flow diagram showing enhanced data verification according to the present invention and FIG. 6 is a flow diagram showing enhanced data verification according to the present invention.

Referring to FIG. 5, a flow diagram of the operation of POST as it pertains to enhanced data verification is shown. In step 500, POST tests and initializes the computer system in a manner which is well known. POST reads the boot program 400 from disk 108 into memory, step 502. POST then determines if the stored check code 326 value is present, step 506. A flag bit can be set in flags 330 to indicate the presence of the check code 326. If check code 326 is not present as determined by step 504 then processing continues at step 512. If the stored check code 326 is present in step 504 then control passes to step 508. POST reads the stored check code 326 value, step 504. In step 508, POST calculates the boot program 400 check code. The check code is, for example, the previously described MDC. POST compares the previously retrieved stored check code 326 value with the computed check code value of the boot program 400, step 510. If the comparison of step 510 indicates that the codes match then processing continues on to step 512 where control is passed to the boot program 400. Preferably, POST disables the read and write functions of the EEPROM 308 through EEPROM controller 310 to fully protect the EEPROM 308 contents. If the comparison of step 510 indicates that the check codes do not match then control passes to step 514 where corrective action is taken. Corrective action can include: displaying a message to the user, pausing further processing and/or "booting" a known diskette. If the stored and computed check code values match, POST assumes there has been no change to the boot program 400 and allows the system to boot. If the values do not match, then POST issues a message indicating that the boot program 400 has probably been damaged or altered since the most recent boot program stored check code computation. The intent of the message is to imply that there is a possibility that the boot program 400 has been damaged or otherwise modified. Checking the check code of the boot program can be an optional feature enabled through a control bit, e.g. flag, stored in EEPROM.

Once the boot program 400 obtains control, step 512, the boot program 400 itself preferably performs additional checks. The boot program 400 identifies and verifies the disk partition to be loaded, step 516. The result of the disk partition verification is checked, step 518, and if the disk partition verification did not succeed then corrective action is taken, step 520. Corrective action can include: displaying a message to the user, pausing further processing and/or booting the system from a known diskette. A verified disk partition allows the boot program 400 to transfer control to the disk partition program, step 522. The verification process of step 516 may include a verification program such as the IBM program "Antivirus/2" which is commercially available from IBM Corporation.

Figure 6:
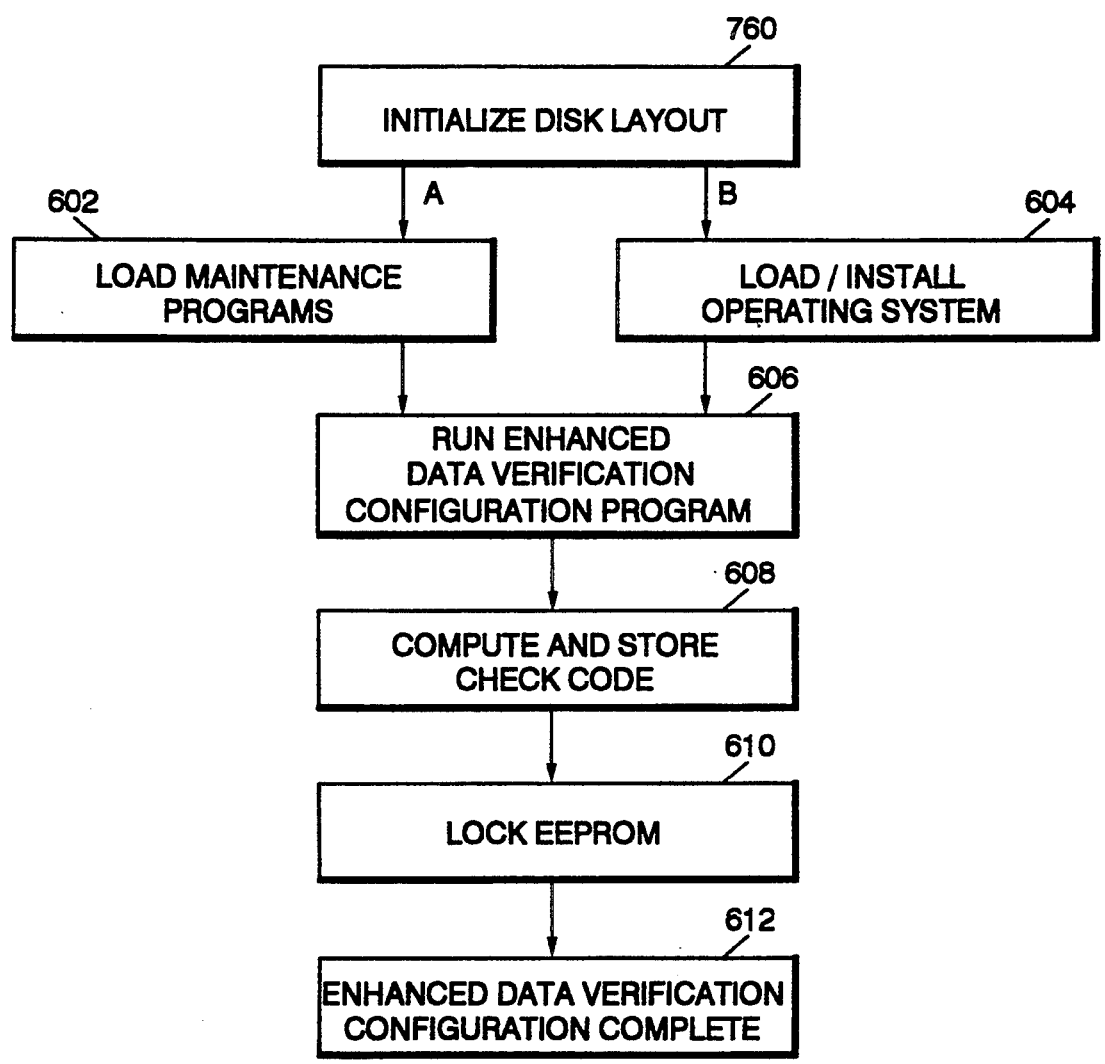

Referring to FIG. 6, a flow diagram of configuring computer system 100 for enhanced data verification is shown. The disk layout as described in conjunction with FIG. 4 is established, step 600. Establishing the disk layout can be done with conventional programs such as the FDISK program provided with the DOS operating system which is standard and well known. An enhanced data verification configuration program is provided as either part of a maintenance package (path A) or as part of an operating system package (path B); the enhanced data verification configuration program may be provided as part of both packages. The enhanced data verification configuration program is loaded when either the maintenance programs are loaded, step 602, or the operating system is loaded and installed, step 604. It is preferred that both maintenance programs and operating system programs be manufactured and distributed on read-only media, thus insuring the origin and integrity of the programs. The enhanced data verification configuration program is run during step 606. Since the user will most likely install an operating system at some point, the preferred path is path B with the enhanced data verification configuration program included with the operating system program package. The enhanced data verification configuration program computes and stores the check code 326, step 608. The check code 326 is computed against the boot program 400. The check code 326 is a code such as the previously described MDC. At this point the enhanced data verification configuration program can also store a flag value in EEPROM 308 in flag field 330 to indicate that a check code has been computed and stored in the EEPROM 308. Additionally, the enhanced data verification configuration program can also store a flag to indicate that the boot sequence should be modified. For example, it would be advantageous to remove the diskette from the standard set of boot devices since a diskette may contain an unverified boot program. Omitting the diskette from the boot sequence can be overridden by, e.g., entering password 328. The enhanced data verification configuration program then disables the write function of EEPROM 308, step 610. The enhanced data verification configuration is then complete, step 612.

While the present invention was described above, it will be understood by those skilled in the art that various changes in detail may be made without departing from the spirit, scope, and teaching of the invention. Accordingly, the invention should be limited only as specified by the appended claims.

What is claimed is:

1. A personal computer system compatible with application programs and operating system software, the personal computer system comprising:

a microprocessor;

non-volatile memory electrically coupled to said microprocessor, said non-volatile memory storing a first portion of system microcode that is retrieved and executed by said microprocessor when said computer system is initially powered on, volatile memory electrically coupled to said microprocessor;

a direct access storage device electrically coupled to said microprocessor, said direct access storage device storing a second portion of operating system microcode that is retrieved and executed by said microprocessor after said microprocessor has executed said first portion of microcode, said second portion of operating system microcode including a boot program which, during power on initialization of said system, receives control of said system from said first portion of system microcode, and means contained at least in part in said first portion of system microcode for enabling said microprocessor to verify that said boot program has not undergone unauthorized modification since said computer system was previously powered off, said last-mentioned means operating before control of said system is transferred from said first portion to said boot program.

2. A personal computer system comprising:

a microprocessor;

non-volatile memory electrically coupled to said microprocessor, said non-volatile memory storing a first portion of system microcode that is executed by said microprocessor when said computer system is initially powered on, volatile memory electrically coupled to said microprocessor, a direct access storage device electrically coupled to said microprocessor, said direct access storage device storing a second portion of system microcode associated with an operating system currently installed in said computer system, said second portion of microcode including a boot program which, during power on initialization of said system, is executed by said microprocessor after said microprocessor has finished executing said first portion of microcode, and means contained at least in part in said first portion of microcode for enabling said microprocessor to verify, prior to execution of said boot program, that said boot program has not undergone an unauthorized change since the system was previously powered on, wherein said means for enabling said microprocessor to verify includes means for generating an initial modification detection code, based upon information contained in said boot program, during an initial setup of said computer system, and means operative during subsequent power on executions of said first microcode portion for enabling said microprocessor to use said initial modification detection code as a reference in verifying that said boot program has not undergone a said unauthorized change since said system was previously powered on.

3. The apparatus of claim 2 wherein
said means for generating includes a cryptographic one-way function which calculates a multi-byte value from a given input series of bytes of said boot program.

4. The apparatus of claim 2 wherein
said non-volatile memory includes a check code portion, and
said means for verifying stores said initial modification detection code in said check code portion.

5. The apparatus of claim 4 wherein
said check code portion of said non-volatile memory is disabled to prevent writing to said check code portion after said initial modification detection code is stored in said check code portion.

6. The apparatus of claim 4 wherein
said means for verifying compares a present modification detection code upon power-up of the computer system with said initial modification detection code,
said means for verifying including means for taking corrective action if said present modification detection code does not correspond to said initial modification code,
said means for verifying transferring control to said boot record if said present modification detection code corresponds to said initial modification detection code.

7. The apparatus of claim 4 wherein
said non-volatile memory includes a flag portion, and
said means for verifying stores in said flag portion a flag to indicate the presence of said modification detection code.

8. A personal computer system compatible with application programs and operating system software, the personal computer system comprising:
a microprocessor,
non-volatile memory electrically coupled to said microprocessor, said non-volatile memory storing a first portion of operating system microcode to be executed by said microprocessor when said computer system is initially powered on,
volatile memory electrically coupled to said microprocessor,
a direct access storage device electrically coupled to said microprocessor, said direct access storage device storing, in separate pads thereof, a second portion of operating system microcode and operating system software for an operating system installed in said computer system,
said second portion of operating system microcode including a boot program to be executed by said microprocessor after said first portion of microcode has been executed,
first verifying means for verifying, prior to execution of said boot program by said microprocessor, that said boot program has not been changed in an unauthorized manner since a previous execution of said boot program by said microprocessor, and
second verifying means for verifying that the part of said direct access storage device containing said operating system software has not been changed in an unauthorized manner since the previous power on initialization of said system, said second verifying means operating while said microprocessor is under control of said boot program, and prior to loading of said operating system software from said direct access storage device into said volatile memory, to prepare said computer system for operating under control of said operating system software.

9. The apparatus of claim 8 wherein said boot program includes said second verifying means.

10. A personal computer system comprising:
a microprocessor;
non-volatile memory electrically coupled to said microprocessor, said non-volatile memory storing a first portion of microcode to be executed by said microprocessor for controlling said computer system when said computer system is initially powered on;
volatile memory electrically coupled to said microprocessor;
direct access storage means electrically coupled to said microprocessor, said direct access storage means storing, in separate parts thereof, a second portion of microcode, for controlling said computer system after execution of said first portion of microcode, and software of an operating system installed in said computer system; said second portion of microcode including a boot program;
first verifying means for verifying during execution of said first portion of microcode that said boot program has not been changed in an unauthorized manner since said system was previously powered on; and
second verifying means for verifying during execution of said boot program that said operating system software has not been changed in an unauthorized manner since said computer system was previously powered on; and wherein
said first verifying means includes means for generating an initial modification detection code based upon said boot program during an initial setup of said computer system.

11. The apparatus of claim 10 wherein
said means for generating includes a cryptographic one-way function which calculates a multi-byte value from a given input series of bytes of said boot program.

12. The apparatus of claim 10 wherein
said non-volatile memory includes a check code portion, and
said first verifying means stores said initial modification detection code in said check code portion.

13. The apparatus of claim 12 wherein
said check code portion of said non-volatile memory is disabled to prevent writing to said check code portion after said initial modification detection code is stored in said check code portion.

14. The apparatus of claim 12 wherein
said first verifying means compares a present modification detection code upon power-up of the computer system with said initial modification detection code,
said first verifying means including means for taking corrective action if said present modification detection code does not correspond to said initial modification code,
said first verifying means transferring control to said boot record if said present modification detection code corresponds to said initial modification detection code.

15. The apparatus of claim 12 wherein
said non-volatile memory includes a flag portion, and
said first verifying means stores in said flag portion a flag to indicate the presence of said modification detection code.

* * * * *